United States Patent
Horie et al.

(10) Patent No.: US 6,898,059 B2
(45) Date of Patent: May 24, 2005

(54) HEAD SUSPENSION FOR DISK DRIVE (75) Inventors: Norio Horie, Yokohama (JP); Itsuro Kikkawa, Yokohama (JP); Hajime Arai, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 282 days.

(21) Appl. No.: 10/195,807

(22) Filed: Jul. 15, 2002

(65) Prior Publication Data
US 2003/0161074 A1 Aug. 28, 2003

(30) Foreign Application Priority Data

Feb. 26, 2002 (JP) ........................................ 2002-049222

(51) Int. Cl.$^7$ ............................................... G11B 5/48
(52) U.S. Cl. .................................................... 360/244.9
(58) Field of Search ..................................... 360/244.9

(56) References Cited

U.S. PATENT DOCUMENTS 4,167,765 A   9/1979   Watrous 6,388,842 B1 * 5/2002 Murphy ................... 360/244.8

FOREIGN PATENT DOCUMENTS

JP   2001-155458   6/2001

* cited by examiner

Primary Examiner—George J. Letscher
(74) Attorney, Agent, or Firm—Jordan and Hamburg LLP (57) ABSTRACT

A head suspension for a disk drive has a load beam. The load beam consists of a rigid part and a resilient part that are independent of each other. The head suspension is capable of suppressing impedance variations in a flexure and avoiding air disturbance. The head suspension has a plate attached to a carriage, the load beam having the rigid part and the resilient part, and the flexure attached to the load beam and extended toward the plate. The resilient part of the load beam is made of a resilient material that is independent of the rigid part. A first side of the resilient material is laid on an end of the rigid part and joined thereto. A second side of the resilient material is joined to the plate. The first side of the resilient material is provided with a cut to partly expose the end of the rigid part. The flexure is extended through the cut toward the plate.

6 Claims, 9 Drawing Sheets

HEAD SUSPENSION FOR DISK DRIVE

BACKGROUND OF THE INVENTION

1. Field of the Invention

The present invention relates to a head suspension for a disk drive incorporated in an information processing apparatus such as a personal computer.

2. Description of the Related Art

A hard disk drive (HDD) records and reproduces information to and from rotating magnetic or magneto-optical disks. The HDD has a carriage that is turned around a spindle by a positioning motor.

An example of the carriage is disclosed in U.S. Pat. No. 4,167,765. The carriage of this disclosure includes carriage arms, a head suspension attached to a front end of each carriage arm, a head attached to the head suspension, and a slider attached to the head. The sliders face disks. When the disks are rotated at high speed, the sliders slightly float from the disks, and air bearings are formed between the disks and the sliders.

The head suspension includes a load beam made of a precision thin plate spring, a flexure made of a very thin plate spring fixed to a front part of the load beam by, for example, laser welding, and a plate fixed to a base of the load beam by, for example, laser welding. The plate is fixed to a head suspension fitting face of the carriage arm.

Recent hard disk drives employ high-density disks and drive the disks at high speed. For such high-density disks, the head suspensions must have excellent vibration characteristics to correctly position the heads on narrow tracks of the disks and characteristics to avoid the influence of air disturbance caused by the disks rotating at high speed. To include such and other requirements, the head suspensions are frequently subjected to intricate processes.

The high-density disks require head suspensions having high rigidity and low spring constants. To meet the requirement, the present inventor proposed in Japanese Patent Laid Open Publication No. 2001-155458 a head suspension 101 of FIG. 12, which differs from a conventional head suspension having a load beam composed of an integrated rigid part and resilient part.

Figure 12:
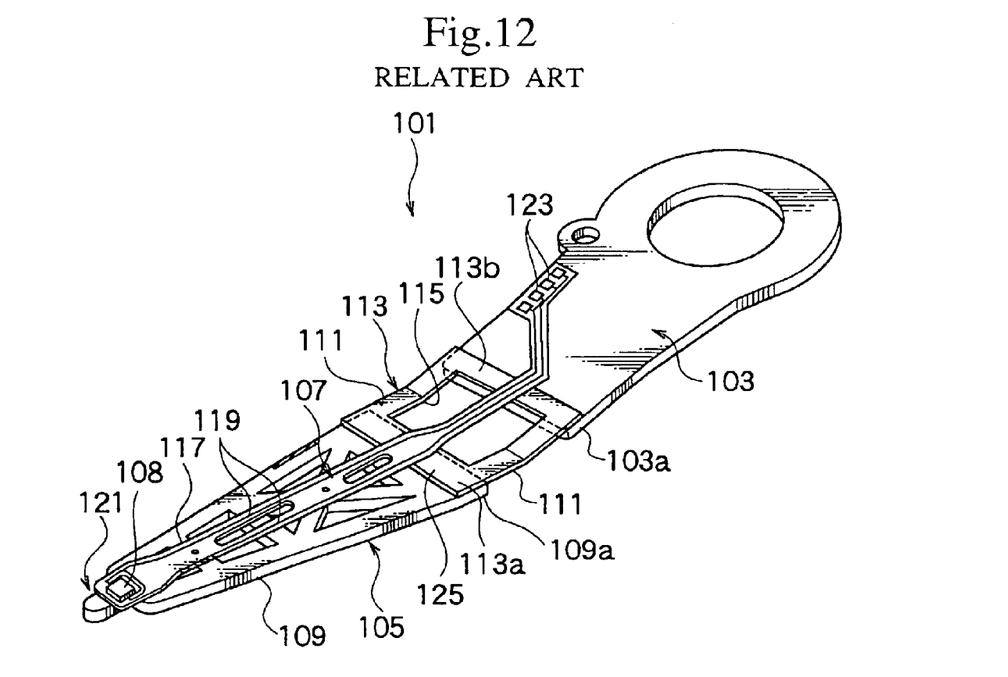
FIG. 12 is a perspective view showing a head suspension according to a related art.

In FIG. 12, the head suspension 101 has a plate 103, a load beam 105, and a flexure 107.

The plate 103 is attached to a carriage arm of a carriage. The carriage drives the head suspension 101 around a spindle.

The load beam 105 applies load on a slider 108 arranged at a front end of the load beam 105. The load beam 105 consists of a rigid part 109 and a resilient part 111. The resilient part 111 is made of a resilient material 113 that is independent of the rigid part 109.

The resilient material 113 is a rectangular plate and has an opening 115 to form the resilient part 111. A first side 113a of the resilient material 113 is laid on an end 109a of the rigid part 109 and is fixed thereto by, for example, laser welding or bonding. A second side 113b of the resilient material 113 is laid on an end 103a of the plate 103 and is fixed thereto by, for example, laser welding or bonding.

Figure 13:
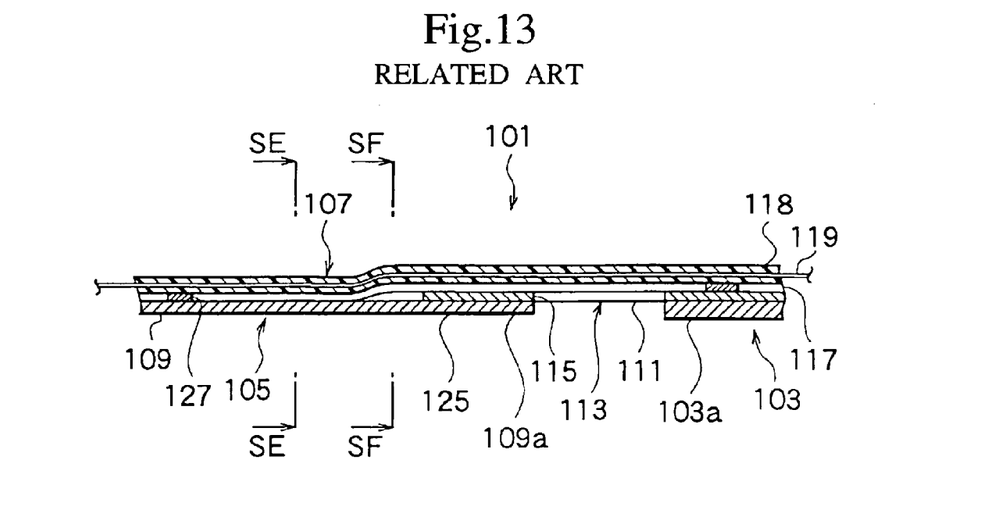
FIG. 13 is a sectional view partly showing a metal base of a flexure with a slit according to the related art.

The flexure 107 is attached to the rigid part 109 of the load beam 105 by, for example, laser welding and is extended over the resilient material 113 toward the plate 103. Referring also to FIG. 13, which is a longitudinal section partly showing the head suspension 101, the flexure 107 consists of a metal base 117 made of, for example, a resilient thin stainless steel rolled plate, an electric insulating layer 118 formed on the metal base 117, and a conductive path 119 formed in the insulating layer 118. An end of the conductive path 119 is electrically connected to a terminal of the head 121, and the other end of the conductive path 119 is electrically connected to a terminal 123 for external connection.

In the head suspension 101, the load beam 105 consists of the rigid part 109 and resilient material 113 that are separate from each other. Namely, the rigid part 109 and resilient material 113 may be made of proper materials of their own and may have proper thicknesses of their own, to easily and simultaneously realize required properties such as high rigidity for the rigid part 109 and a low spring constant for the resilient part 111. The resilient part 111 may be made of a precision rolled plate, to provide a stable low spring constant.

The separate rigid part 109 and resilient material 113, however, form an overlapping part 125 between them. Where the flexure 107 is on the overlapping part 125, the impedance of the conductive path 119 is affected.

In FIG. 13, the metal base 117 of the flexure 107 is provided with an oblong slot 127. The slot 127 is made by partly removing the metal base 117 under the conductive path 119, to improve electric characteristics. Namely, the slot 127 reduces electric capacitance between the conductive path 119 and the metal base 117, to increase an electric resonance frequency. The slot 127 also functions to realize electric alignment with respect to flexible cables or ICs connected to the head 121 or head suspension 101, thereby correctly transmitting signals.

Under the slot 127, there is another metal layer such as the rigid part 109, which also produces electric capacitance. If the distance between the flexure 107 and the rigid part 109 changes, electric capacitance between them also changes, to vary electric characteristics and spoil the function of the slot 127.

Figure 14:
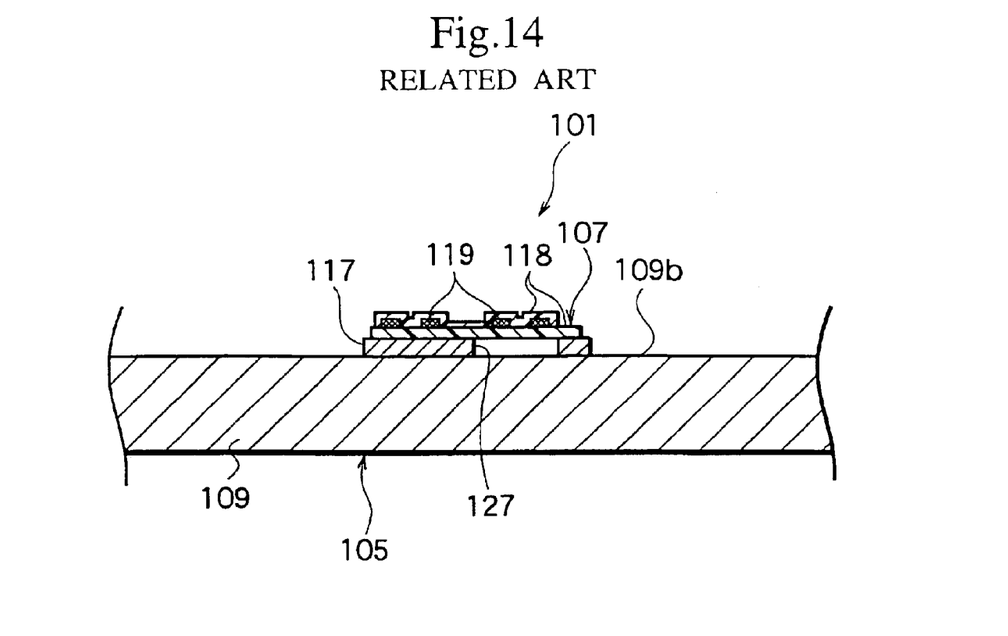
FIG. 14 is a sectional view taken along a line SE—SE of FIG. 13.
Figure 15:
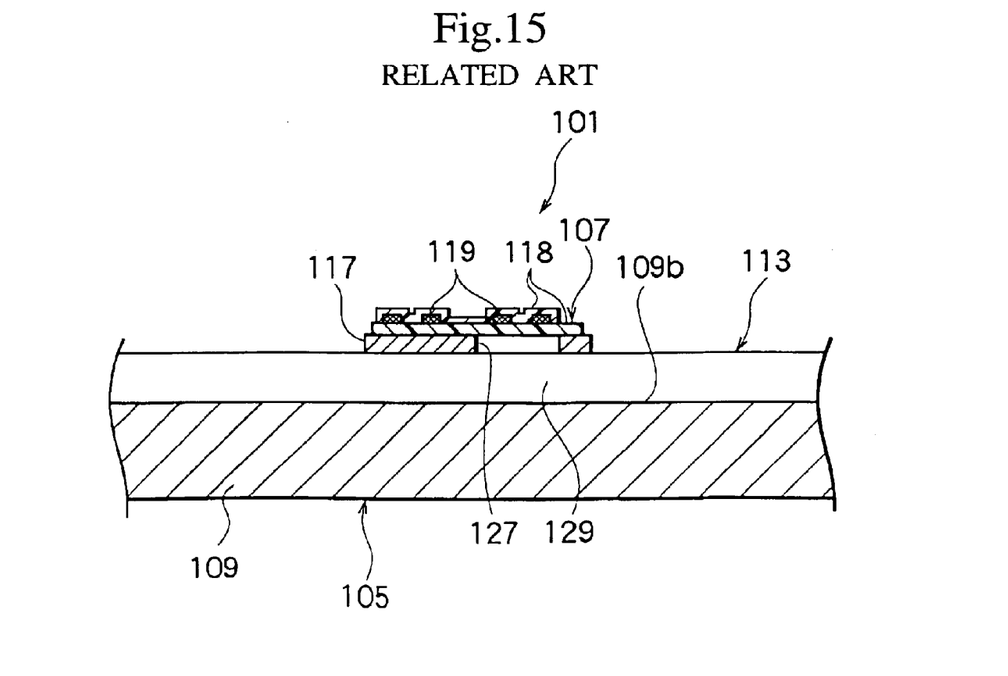
FIG. 15 is a sectional view taken along a line SF—SF of FIG. 13.

If the rigid part 109 and resilient part 111 are integral with each other, there will be no overlapping part 125 between them, and therefore, the flexure 107 will closely be attached to the load beam 105 and will maintain, even with the presence of the slot 127, constant electric capacitance from the rigid part 109 to the resilient part 111. However, the flexure 107 of FIG. 13 crosses the overlapping part 125. Namely, the flexure 107 changes its state from FIG. 14, which is a sectional view taken along a line SE—SE of FIG. 13, to FIG. 15, which is a sectional view taken along a line SF—SF of FIG. 13. In FIG. 15, the flexure 107 forms a gap 129 with respect to a surface 109b of the rigid part 109. Between the state of FIG. 14 in which the flexure 117 is tightly attached to the surface 109b and the state of FIG. 15 in which the flexure 117 forms the gap 129, the flexure 117 changes its electric capacitance to vary the impedance of the conductive path 119.

Signals transmitted through the conductive path 119 are weak, and therefore, such impedance variations hinder precision write and read operations.

The flexure 107 extended across the overlapping part 125 not only forms the gap 129 with respect to the rigid part 109 but also protrudes from the overlapping part 125 to disturb airflow to flutter the flexure 107 and load beam 105 when disks in the disk drive are rotated at high speed.

SUMMARY OF THE INVENTION

An object of the present invention is to provide a head suspension for a disk drive, having a load beam consisting of separate rigid and resilient parts capable of maintaining a constant impedance for a conductive path of a flexure and minimizing the influence of air disturbance.

A first aspect of the present invention provides a head suspension for a disk drive, having a plate attached to a carriage and turned around a spindle, a load beam having a rigid part and a resilient part and supported by the plate, to apply load on a slider arranged at a front end of the load beam, and a flexure having a head to write and read data to and from a hard disk and a conductive path to transmit write and read signals to and from the head. The flexure is attached to the load beam and is extended toward the plate. The resilient part of the load beam is made of a resilient material that is independent of the rigid part. A first side of the resilient material is laid on an end of the rigid part and is joined thereto. A second side of the resilient material is joined to the plate. The first side of the resilient material is provided with a first cut to partly expose the end of the rigid part. The flexure is extended through the first cut toward the plate.

In the head suspension of the first aspect, a second aspect of the present invention provides the second side of the resilient material with a second cut communicating with the first cut, to partly expose the plate and pass the flexure through the second cut.

In the head suspension of the first aspect, a third aspect of the present invention provides the resilient material with an opening between the first and second sides. The opening is connected to the first cut and sets the resiliency of the resilient part.

In the head suspension of the second aspect, a fourth aspect of the present invention provides the resilient material with an opening between the first and second sides. The opening is connected to the first and second cuts and sets the resiliency of the resilient part.

In the head suspension of any one of the second and fourth aspects, a fifth aspect of the present invention lays the second side of the resilient material over the plate, provides the plate with a through window adjacent to the end of the plate where the resilient material is fixed, enlarges the second cut of the resilient material over the window, linearly extends the flexure from the rigid part through the first and second cuts and over the window of the plate, and deflects the flexure on the window toward a side of the window.

According to the first aspect, the plate is attached to a carriage so that the plate is driven by the carriage around a spindle. The load beam having the rigid part and resilient part is supported by the plate, to apply load on the slider arranged at a front end of the load beam. The plate and load beam are rotated to move the slider from one track to another on a hard disk.

The resilient part of the load beam is made of the resilient material independent of the rigid part. The first side of the resilient material is laid on an end of the rigid part and is joined thereto, and the second side of the resilient material is joined to the plate. As a result, the rigid part and resilient part may be made of proper materials, respectively, and may have proper thicknesses, respectively, to easily and simultaneously realize required properties such as rigidity for the rigid part and a low spring constant for the resilient part. The resilient part may be made of a precision rolled material to provide a stable low spring constant.

The first side of the resilient material is provided with the first cut to partly expose the end of the rigid part. The flexure is extended through the first cut toward the plate. Namely, the flexure is arranged from the rigid part toward the plate without crossing over an overlapping part of the rigid part and resilient material and without producing a gap at the overlapping part. The flexure may have a slit to improve electric characteristics without varying the impedance of the flexure on the rigid part. Consequently, the flexure can transmit precision write and read signals.

The flexure is not on the overlapping part of the rigid part and resilient material, and therefore, produces no gap between the flexure and the rigid part. The flexure is arranged in the first cut and never protrudes from the overlapping part to disturb airflow. When disks in the disk drive are rotated at high speed, there will be no air disturbance to flutter the flexure or the load beam.

In addition to the effects of the first aspect, the second aspect provides the second side of the resilient material with the second cut communicating with the first cut, to partly expose the plate and pass the flexure therethrough. At the second cut, the flexure never rides on an overlapping part of the plate and resilient material when the flexure is extended from the rigid part toward the plate. The flexure is surely attached to the rigid part. The flexure may have a slit to improve electric characteristics without varying the impedance of the flexure on the rigid part. Consequently, the flexure can transmit precision write and read signals.

The flexure is arranged in the second cut and never protrudes from the overlapping part. At this part, the flexure never disturbs airflow. When disks in the disk drive are rotated at high speed, there will be no air disturbance to flutter the flexure or the load beam.

In addition to the effects of the first aspect, the third aspect provides the resilient material with an opening between the first and second sides thereof, to set the resiliency of the resilient part and partly reduce the bending rigidity (spring constant) of the resilient material. This results in correctly forming the resilient part serving as a hinge between the plate and the rigid part.

The first cut is continuous to the opening, to pass the flexure through the first cut and opening without changing the attitude thereof. Namely, the flexure never rides on the resilient material and is secured to the rigid part. The flexure may have a slit to improve electric characteristics without varying the impedance of the flexure on the rigid part. This allows the flexure to transmit precision write and read signals.

When disks in the disk drive are rotated at high speed, there will be no air disturbance to flutter the flexure or the load beam.

In addition to the effects of the second aspect, the fourth aspect provides the resilient material with an opening between the first and second sides thereof, to set the resiliency of the resilient part and partly reduce the bending rigidity (spring constant) of the resilient material. This results in correctly forming the resilient part serving as a hinge between the plate and the rigid part.

The first and second cuts are continuous to the opening, to pass the flexure through the first and second cuts and opening without changing the attitude thereof. Namely, the flexure never crosses over the resilient material up to the second cut and is secured to the rigid part. The flexure may have a slit to improve electric characteristics without varying the impedance of the flexure on the rigid part. Consequently, the flexure can transmit precision write and read signals.

When disks in the disk drive are rotated at high speed, there will be no air disturbance to flutter the flexure or the load beam.

In addition to the effects of the second and fourth aspects, the fifth aspect lays the second side of the resilient material over the plate, to surely support the load beam with the plate.

The fifth aspect provides the plate with the through window adjacent to the end of the plate where the resilient material is fixed and enlarges the second cut to the window, to reduce the total weight of the head suspension.

The enlarged second cut prevents the flexure from passing over the resilient material up to the window and more firmly secures the flexure to the rigid part. The flexure may have a slit to improve electric characteristics without varying the impedance of the flexure on the rigid part. Consequently, the flexure can transmit precision write and read signals.

The enlarged second cut prevents the flexure from protruding from the resilient material between the rigid part and the window of the plate. When disks in the disk drive are rotated at high speed, there will be no air disturbance to flutter the flexure or the load beam.

DETAILED DESCRIPTION OF EMBODIMENTS (First Embodiment)

Figure 1:
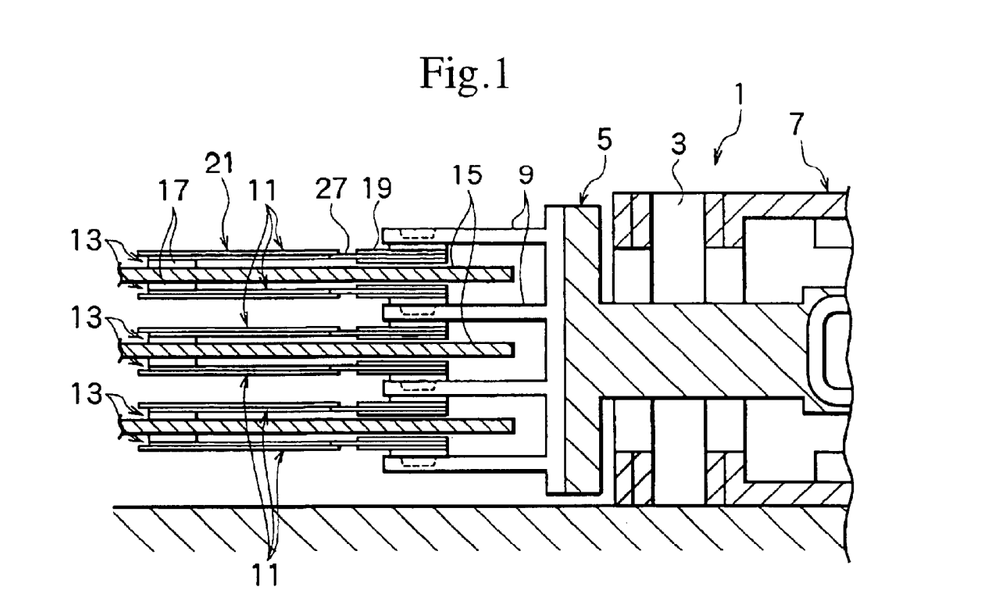
FIG. 1 is a sectional view partly showing a hard disk drive with head suspensions according to a first embodiment of the present invention.

FIG. 1 is a sectional view partly showing a hard disk drive having head suspensions according to the first embodiment of the present invention. The hard disk drive 1 has a carriage 5 rotatable around a spindle 3.

The carriage 5 is driven around the spindle 3 by a positioning motor 7 such as a voice coil motor. The carriage 5 has a plurality of (four in FIG. 1) carriage arms 9. Each carriage arm 9 is provided with the head suspension 11 at a front end thereof. A front end of the head suspension 11 is provided with a head 13. The carriage 5 is turned around the spindle 3, to move the head 13 to a target track on a disk 15.

The head 13 is used to write and read data to and from the disk 15 and includes a slider 17 facing tracks on the disk 15 and a transducer (not shown) supported with the slider 17. When the disk 15 is rotated at high speed, air enters between the disk 15 and the slider 17 to slightly float the slider 17 from the disk 15 and form an air bearing between the disk 15 and the slider 17.

Figure 2:
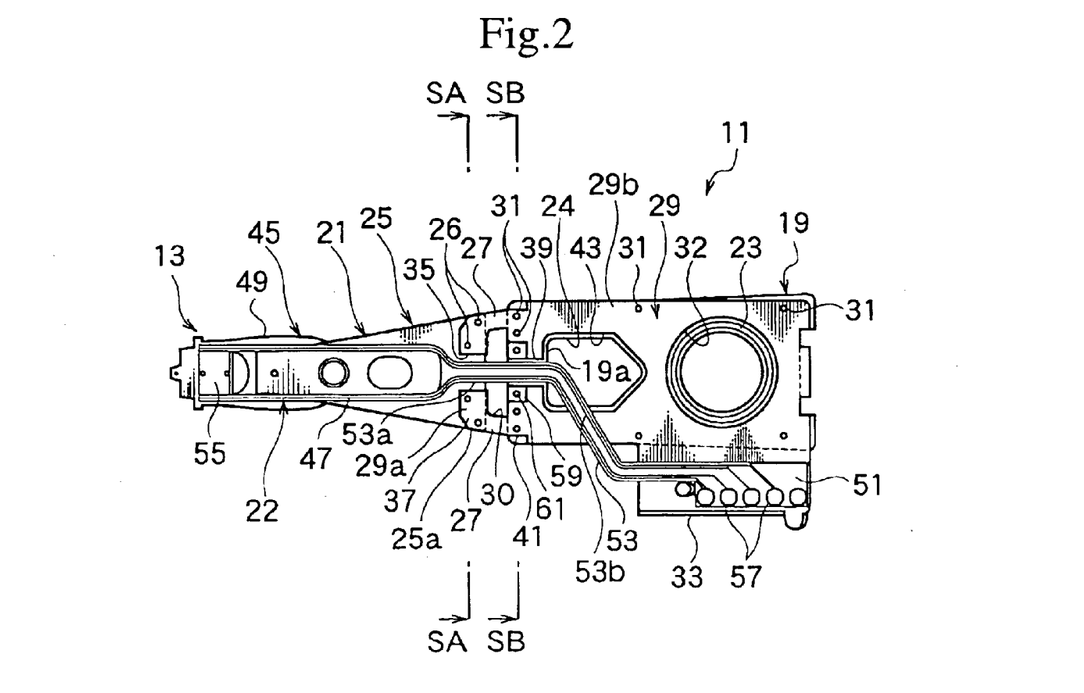
FIG. 2 is a plan view showing the head suspension of the first embodiment seen from a flexure side.
Figure 3:
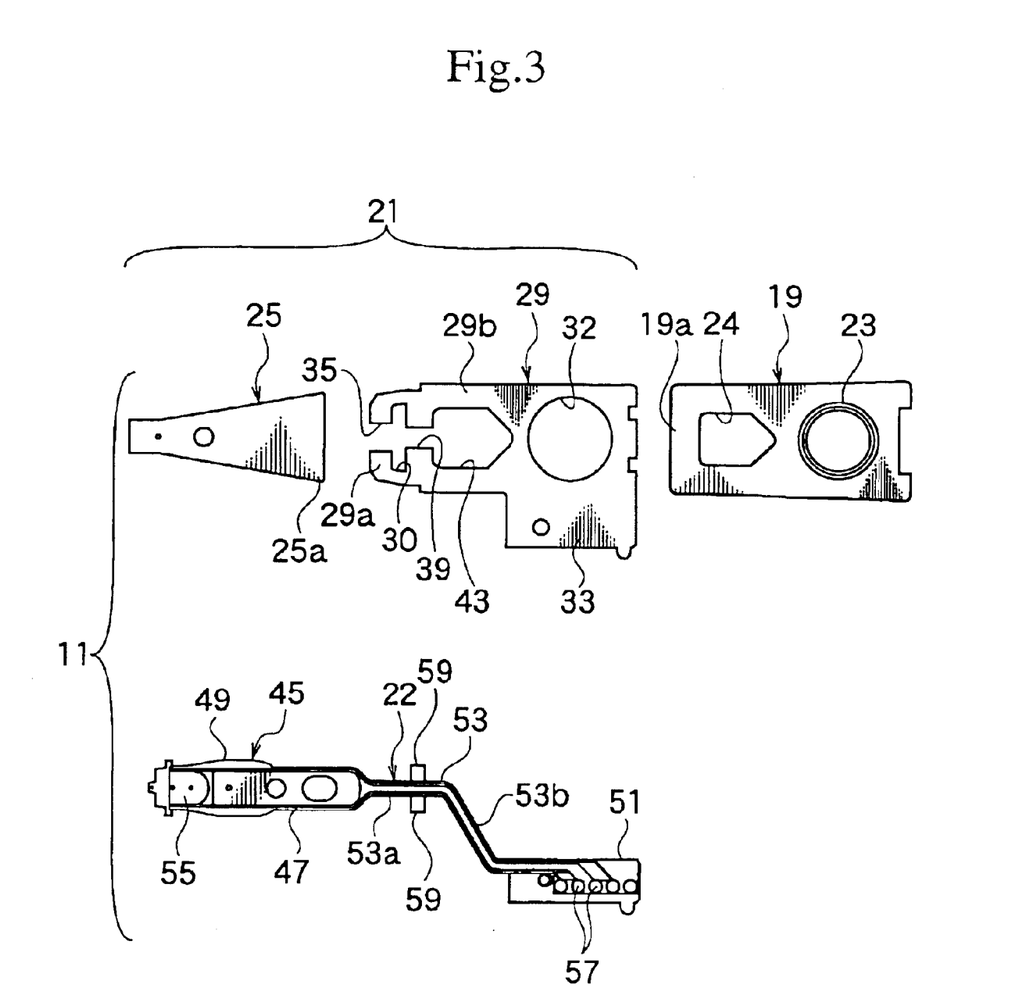
FIG. 3 is an exploded plan view showing the head suspension of the first embodiment.

FIG. 2 is a plan view showing the head suspension 11 seen from a flexure side and FIG. 3 is an exploded plan view showing the head suspension 11. The head suspension 11 has a plate 19, a load beam 21, and a flexure 22.

The plate 19 is attached to the carriage arm 9 on the carriage 5 (FIG. 1) and is driven by the carriage 5 around the spindle 3. The plate 19 is made of, for example, a rectangular stainless steel plate. According to the embodiment, the thickness of the plate 19 is, for example, 200 im. The plate 19 has a boss 23 and a through window 24 adjacent to an end 19a where a resilient material (to be explained later) is fixed.

The load beam 21 applies load on the slider 17 (FIG. 1) arranged at a front end thereof The load beam 21 includes a rigid part 25 and a resilient part 27. The resilient part 27 is made of the resilient material 29 that is independent of the rigid part 25.

The rigid part 25 is made of, for example, stainless steel. The rigid part 25 may be made of an alloy of light metal (metal lighter than Fe) such as aluminum (Al) and titanium (Ti), or synthetic resin, to simultaneously realize lightness and rigidity for the head suspension 11. The rigid part 25 may be made of a composite material (clad material) consisting of two or more layers of light metal such as aluminum and titanium or an alloy of the light metal and other metal such as stainless steel.

The resilient material 29 is substantially rectangular and extends from the plate 19 to the rigid part 25. The resilient material 29 is made of, for example, resilient thin stainless steel and has a precision low spring constant lower than that of the rigid part 25.

The resilient material 29 has an opening 30 between a first side 29a and a second side 29b. The opening 30 is made by, for example, etching or precision pressing and sets the resiliency of the resilient part 27. Namely, the opening 30 partly reduces the bending rigidity (spring constant) of the resilient material 29 and forms the resilient part 27 serving as a hinge between the plate 19 and the rigid part 25.

The first side 29a of the resilient material 29 is laid on an end 25a of the rigid part 25 and is fixed thereto by, for example, welding (such as laser welding) 26 or bonding. The second side 29b of the resilient material 29 corresponds to the plate 19 and is generally laid over the plate 19. The second side 29b of the resilient material 29 is fixed to an end 19a and other part of the plate 19 by, for example, welding (such as laser welding) 31 or bonding.

The resilient material 29 has a fitting hole 32, which is concentric with the boss 23 of the plate 19. On one side of the fitting hole 32, the resilient material 29 has a support 33 to support a terminal (to be explained later) of the flexure 22.

Figure 4:
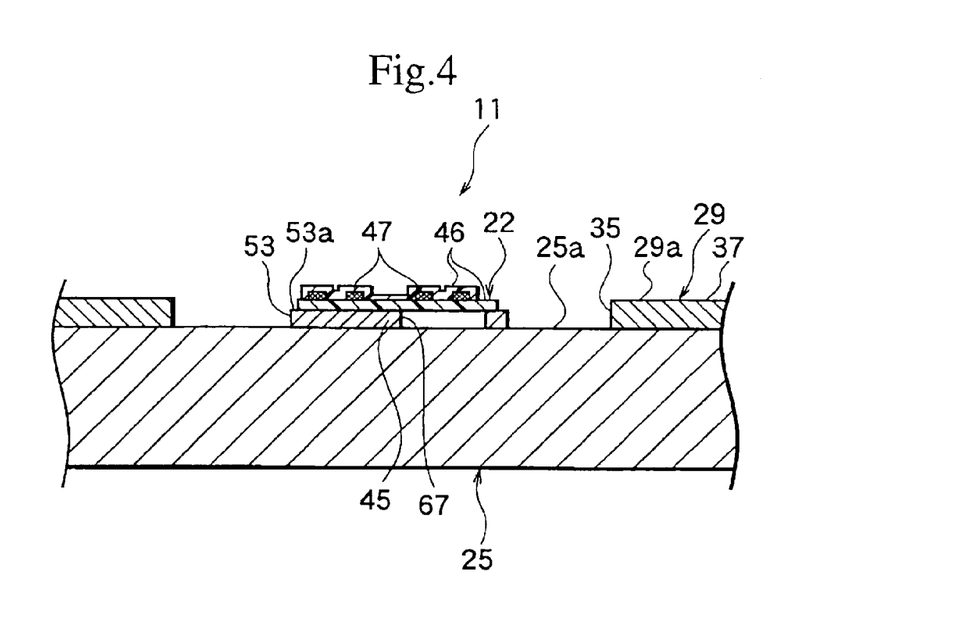
FIG. 4 is a sectional view taken along a line SA—SA of FIG. 2.

Referring to FIGS. 2, 3, and 4, which is a sectional view taken along a line SA—SA of FIG. 2, the first side 29a of the resilient material 29 is provided with a first cut 35. At an overlapping part 37 where the first side 29a of the resilient material 29 overlaps the end 25a of the rigid part 25, the first cut 35 partly exposes the end 25a. According to the first embodiment, the first cut 35 is substantially at the lateral (vertical in FIGS. 2 and 3) center of the resilient material 29 and is continuous to the opening 30. The width of the first cut 35 is wider than a part of the flexure 22 laid in the first cut 35.

Figure 5:
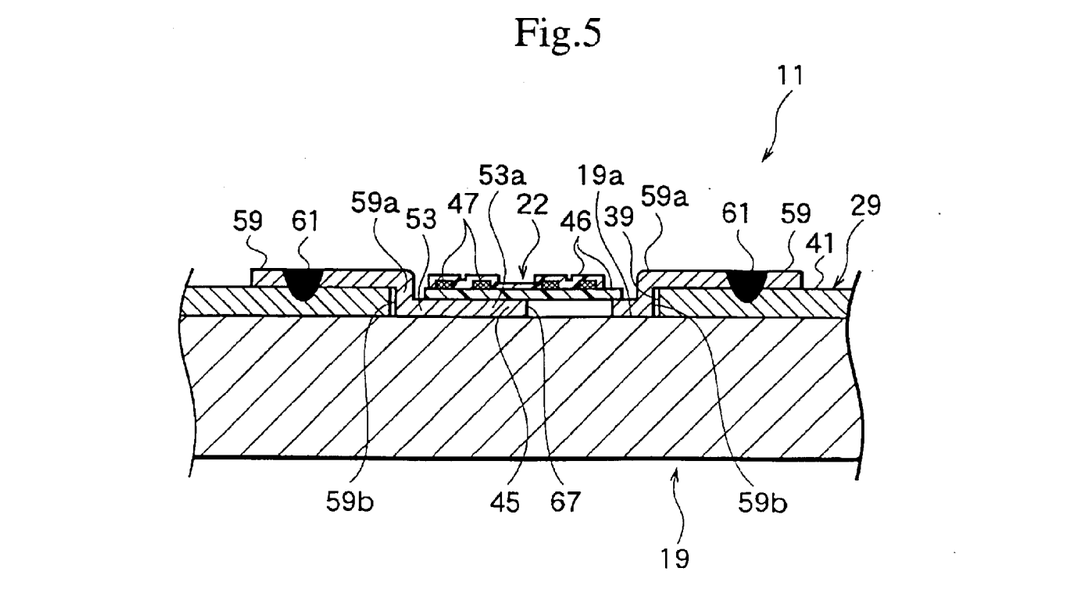
FIG. 5 is a sectional view taken along a line SB—SB of FIG. 2.

Referring to FIGS. 2, 3, and 5, which is a sectional view taken along a line SB—SB of FIG. 2, the second side 29b of the resilient material 29 is provided with a second cut 39. At an overlapping part 41 where the second side 29b of the resilient material 29 overlaps the end 19a of the plate 19, the second cut 39 partly exposes the end 19a. The second cut 39 is substantially at the lateral (vertical in FIGS. 2 and 3) center of the resilient material 29 and is continuous to the opening 30 and first cut 35. The width of the second cut 39 is slightly wider than a part of the flexure 22 laid in the second cut 39. The second cut 39 is connected to an enlarged part 43. The enlarged part 43 corresponds to the window 24 of the plate 19 in shape and size. Namely, the enlarged part 43 extends the second cut 39 onto the window 24.

The flexure 22 consists of a metal base 45 made of, for example, a resilient thin stainless steel rolled plate, an electric insulating layer 46 formed on the metal base 45, and a conductive path 47 formed in the insulating layer 46.

Figure 6:
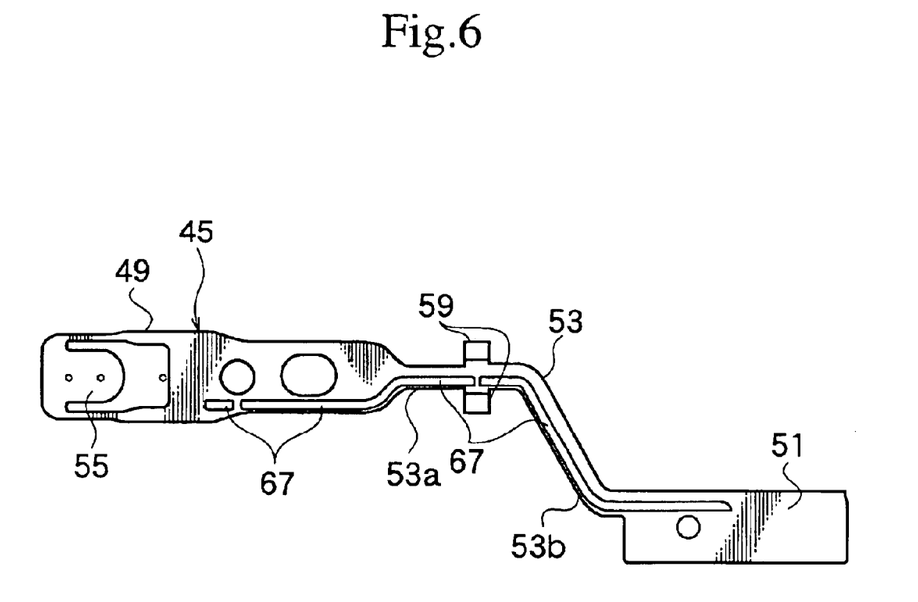
FIG. 6 is a plan view showing a metal base according to the first embodiment.

FIG. 6 is a plan view showing the metal base 45. The metal base 45 consists of a front 49, a rear 51, and a middle 53. The front 49, middle 53, and rear 51 of the metal base 45 are provided with slots 67 as shown in FIGS. 4 to 6. The slots 67 have oblong shapes formed by partly removing the metal base 45 and serve to improve electric characteristics. Namely, the slots 67 reduces electric capacitance between the conductive path 47 and the metal base 45, thereby increasing an electric resonance frequency. The slots 67 also function to realize electric alignment with respect to flexible cables or ICs connected to the head 13 or the head suspension 11, thereby correctly transmitting signals. The slots 67 partly extend in the first cut 35 and second cut 39 as shown in FIGS. 4 and 5.

The front 49 of the metal base 45 has a tongue 55 to which the slider 17 (FIG. 1) of the head 13 is attached. The front 49 is linear. The rear 51 has a terminal 57 for external connection. The middle 53 is narrower than the front 49 and rear 51 and consists of a linear part 53a and a deflecting part 53b. The linear part 53a is continuous to the front 49 and has fixing pieces 59 on each side thereof.

The fixing pieces 59 are integral with the metal base 45 and protrude therefrom. As shown in FIG. 5, a base 59a of each fixing piece 59 vertically rises from the metal base 45 for the thickness of the resilient material 29, and then, the fixing piece 59 is bent in the direction of the surface of the metal base 45. Consequently, the fixing piece 59 is in contact with the resilient material 29 at the end 19a of the plate 19, and the base 59a and linear part 53a are accommodated in the second cut 39.

The deflecting part 53b of the flexure 22 deflects from the window 24. Namely, the deflecting part 53b deflects sideward from the linear part 53a so that the rear 51 may deviate from the front 49. At the deflecting part 53b, the flexure 22 up to the rear 51 rides on the resilient material 29.

An end of the conductive path 47 is electrically connected to a terminal of the head 13, and the other end thereof is electrically connected to the terminal 57 for external connection.

The front 49 of the flexure 22 is arranged at the lateral center of the rigid part 25 and is fixed thereto by, for example, laser welding or bonding. The rear 51 of the flexure 22 is arranged on the support 33 of the resilient material 29 and is fixed thereto by, for example, laser welding or bonding. At the middle 53 of the flexure 22, an outer face 59b of the base 59a of each fixing piece 59 is restricted and positioned by the second cut 39, and the fixing pieces 59 are fixed to the resilient material 29 by, for example, welding (such as laser welding) 61 or bonding.

As a result, the flexure 22 extends along the lateral (vertical in FIGS. 2 and 3) center of the load beam 21. Namely, the flexure 22 linearly runs along the rigid part 25, first cut 35, and second cut 39, reaches the window 24 of the plate 19, and deflects from the window 24 toward the rear 51. The linear part 53a of the flexure 22 is received in the first cut 35, passes over the opening 30, and reaches the second cut 39. The linear part 53a is received in the second cut 39. The fixing pieces 59 are fixed to the resilient material 29. As explained above, the base 59a of each fixing piece 59 is bent in advance, so that the linear part 53a may be received in the second cut 39.

The deflecting part 53b of the flexure 22 rides on the resilient material 29 at one side of the plate 19. The start of the deflecting part 53b is on the window 24 and in the enlarged part 43 of the second cut 39.

According to the first embodiment, the resilient part 27 of the load beam 21 is made of the resilient material 29 that is independent of the rigid part 25. The first side 29a of the resilient material 29 is laid on the end 25a of the rigid part 25 and is joined thereto, and the second side 29b of the resilient material 29 is joined to the plate 19. The first side 29a of the resilient material 29 is provided with the first cut 35 to partly expose the end 25a of the rigid part 25. The flexure 22 is passed through the first cut 35 and is extended toward the plate 19.

The second side 29b of the resilient material 29 is provided with the second cut 39 communicating with the first cut 35, to partly exposes the plate 19. The flexure 22 is passed through the second cut 39.

The opening 30 for setting the resiliency of the resilient part 27 is formed between the first and second sides 29a and 29b of the resilient material 29. The opening 30 is continuous to the first cut 35 or the first cut 35 and second cut 39.

The second side 29b of the resilient material 29 is generally laid over the plate 19. The plate 19 is provided with the through window 24 adjacent to the end 19a where the resilient material 29 is fixed. The second cut 39 is enlarged up to the window 24. As a result, the flexure 22 is linearly extended from the rigid part 25 through the first cut 35 and second cut 39 onto the window 24 of the plate 19 and is deflected from the window 24 toward one side of the window 24.

The head suspension 11 is fitted to the carriage arm 9 by plastically deforming the boss 23 in a radial direction.

The plate 19 is turned by the carriage 5 around the spindle, and the load beam 21 applies load on the slider 17 arranged at the front end of the load beam 21. The plate 19 is turned to move the slider 17 of the load beam 21 between tracks on the disk 15.

In the head suspension 11, the load beam 21 is made of the rigid part 25 and resilient material 29 that are separate from each other. As a result, the rigid part 25 and resilient material 29 may be made of their own proper materials and may have their own proper thicknesses, to easily and simultaneously realize required properties such as rigidity for the rigid part 25 and a low spring constant for the resilient part 27. The resilient part 27 may be made of a precision rolled material to provide a stable low spring constant.

The flexure 22 never rides on the overlapping part 37 of the rigid part 25 and resilient material 29, and therefore, the flexure 22 is tightly secured to the end 25a of the rigid part 25 and is extended toward the plate 19. As shown in FIG. 4, no riding gap is formed between the flexure 22 and the rigid part 25. The flexure 22 may have the slits 67 to improve electric characteristics without varying the electric capacitance of the flexure 22 on the rigid part 25. Namely, the slits 67 can fully function to prevent impedance variations and stabilize and improve electric characteristics. As a result, the flexure 22 surely transmits high-precision write and read signals.

At the same time, the flexure 22 never rides on the overlapping part 41 of the plate 19 and resilient material 29 at the second cut 39 and is flatly extended from the rigid part 25 to the plate 19. The flexure 22 is tightly secured to the end 25a of the rigid part 25, to prevent impedance variations and surely transmit high-precision write and read signals.

As shown in FIG. 5, the metal base 45 of the flexure 22 has a slit 67 at the second cut 39. Even with the slit 67, the flexure 22 is tightly secured to the end 19a of the plate 19, to surely suppress impedance variations. As a result, the flexure 22 surely transmits high-precision write and read signals.

The flexure 22 never rides on the overlapping part 37 of the rigid part 25 and resilient material 29, to form no gap between the flexure 22 and the rigid part 25. The flexure 22 is received in the first cut 35, and therefore, never protrudes from the overlapping part 37. The flexure 22 is also received in the second cut 39, and therefore, never protrudes from the overlapping part 41. Consequently, the flexure 22 causes no air disturbance at the overlapping parts 37 and 41. When the disks 15 are rotated at high speed, the head suspension 11 receives no air disturbance. Namely, the flexure 22 and load beam 21 will not flutter.

No fluttering of the flexure 22 results in causing no change in distances to the rigid part 25 and the like, thereby preventing impedance variations.

The opening 30 partly reduces the bending rigidity (spring constant) of the resilient material 29, to correctly form the resilient part 27 serving as a hinge between the plate 19 and the rigid part 25. The first cut 35 and second cut 39 are continuous to the opening 30, to pass the flexure 22 through the first cut 35, opening 30, and second cut 39 without changing the attitude thereof. The flexure 22 never rides on the resilient material 29 up to the second cut 39 and is tightly secured to the rigid part 25 and the end 19a of the plate 19. This surely prevents impedance variations and transmits high-precision write and read signals.

The flexure 22 never protrudes from the resilient material 29, and therefore, is subjected to no air disturbance when the disks 15 are rotated at high speed. As a result, the flexure 22 and load beam 21 cause no fluttering.

The second side 29b of the resilient material 29 is generally laid over the plate 19, to secure the load beam 21 to the plate 19. The window 24 of the plate 19 and the enlarged part 43 of the second cut 39 are effective to reduce the weight of the head suspension 11.

Due to the enlarged part 43 of the second cut 39, the flexure 22 never rides on the resilient material 29 from the rigid part 25 up to the window 24 of the plate 19. As a result, the flexure 22 is tightly secured to the rigid part 25, and the flexure 22 in the second cut 39 is surely secured to the plate 19. This surely prevents impedance variations and transmits high-precision write and read signals.

When the disks 15 are rotated at high speed, the above arrangement is free from air disturbance, thereby preventing the flexure 22 and load beam 21 from fluttering.

The deflecting part 53b of the flexure 22 may ride on the resilient material 29 at one side of the plate 19. The riding of the deflecting part 53b of the flexure 22 causes substantially no influence on the linear part 53a thereof, and therefore, the flexure 22 is kept secured to the rigid part 25.

The deflecting part 53b is on the plate 19 having high rigidity and is oriented in the direction of airflow to be caused when the disks 15 are rotated at high speed. As a result, the flexure 22 is hardly affected by air disturbance at the deflecting part 53b.

(Second Embodiment)

Figure 7:
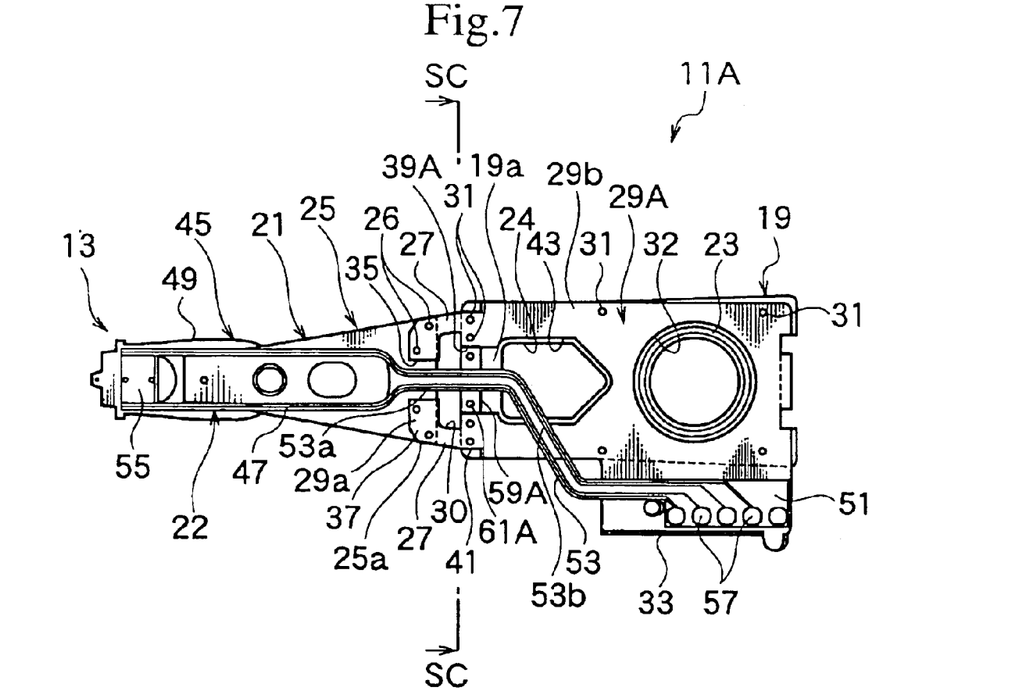
FIG. 7 is a plan view showing a head suspension according to a second embodiment of the present invention seen from a flexure side.
Figure 8:
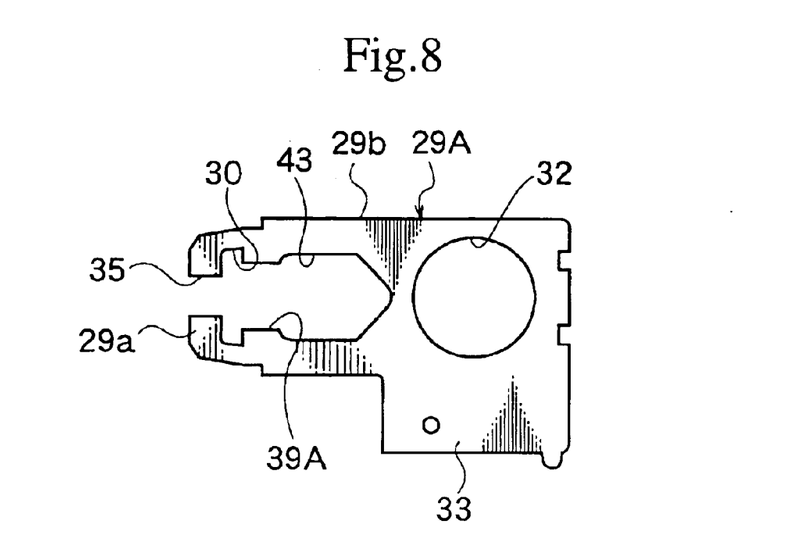
FIG. 8 is a plan view showing a resilient material according to the second embodiment.
Figure 9:
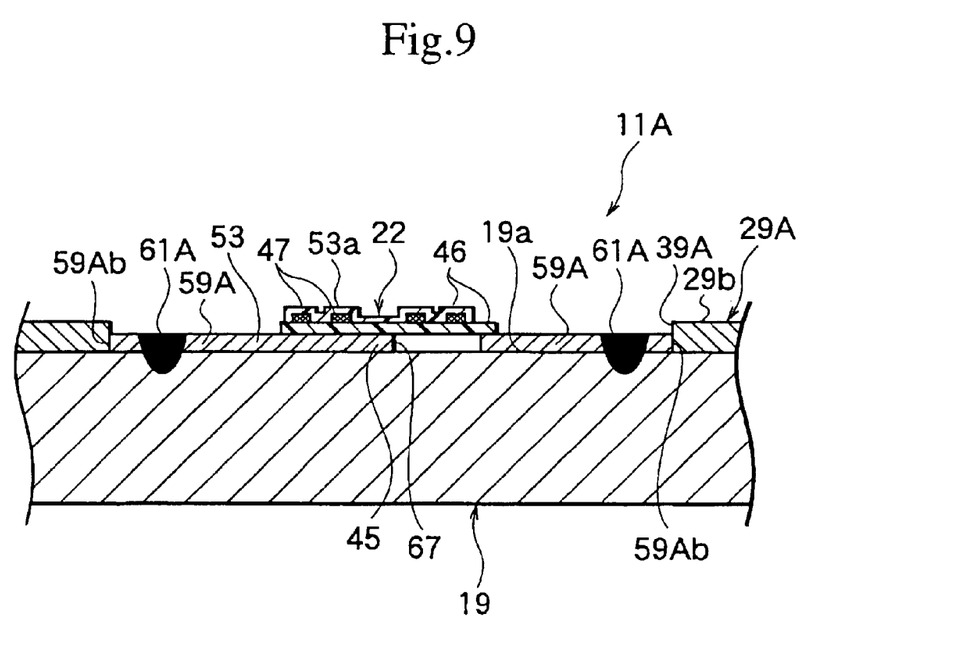
FIG. 9 is a sectional view taken along a line SC—SC of FIG. 7.

FIGS. 7 to 9 show a head suspension for a disk drive according to the second embodiment of the present invention, in which FIG. 7 is a plan view showing the head suspension 11A seen from a flexure side, FIG. 8 is a plan view showing a resilient material 29A, and FIG. 9 is a sectional view taken along a line SC—SC of FIG. 7. The structure of the second embodiment is basically the same as that of the first embodiment, and therefore, like parts are represented with like reference numerals.

According to the second embodiment, the width of a second cut 39A of the resilient material 29A is wider than that of the second cut 39 of the first embodiment. The width of the second cut 39A is determined according to the distance between the tips of fixing pieces 59A of a flexure 22. The fixing pieces 59A flatly protrude from a metal base 45 of the flexure 22 and are secured to an end 19a of a plate 19.

In FIGS. 7 and 9, the fixing pieces 59A are received in the second cut 39A and are fixed to the end 19a of the plate 19 by, for example, welding (such as laser welding) 61A or bonding.

Like the first embodiment, the second embodiment forms a resilient part 27 of a load beam 21 from the resilient material 29A that is independent of a rigid part 25. A first side 29a of the resilient material 29A is laid on an end 25a of the rigid part 25 and is fixed thereto. A second side 29b of the resilient material 29A is fixed to the plate 19. The first side 29a of the resilient material 29A is provided with a first cut 35 to partly expose the end 25a of the rigid part 25. The flexure 22 is passed through the first cut 35 toward the plate 19.

The second side 29b of the resilient material 29A is provided with the second cut 39A that is continuous to the first cut 35 and partly exposes the plate 19. The flexure 22 is extended through the second cut 39A.

An opening 30 is formed between the first and second sides 29a and 29b of the resilient material 29A, to set the resiliency of the resilient part 27. The opening 30 is connected to the first cut 35 and second cut 39A.

The second side 29b of the resilient material 29A is generally laid over the plate 19. The plate 19 is provided with a through window 24 adjacent to the end 19a where the resilient material 29A is fixed. The second cut 39A is enlarged to cover the window 24. The flexure 22 is linearly extended from the rigid part 25 through the first cut 35 and second cut 39A onto the window 24 of the plate 19. On the window 24, the flexure 22 is deflected sideward.

Accordingly, the second embodiment provides the same effects as the first embodiment.

To install the flexure 22, the fixing pieces 59A are set in the second cut 39A and are laid on the end 19a of the plate 19, so that the tips 59Ab of the fixing pieces 59A are restricted by the second cut 39A and are positioned. Consequently, the flexure 22 is correctly and easily installed.

According to the second embodiment, the width of the second cut 39A is widened to contain the fixing pieces 59A, so that the fixing pieces 59A may not protrude from the resilient material 29A. When disks 15 are rotated at high speed, the head suspension 11A is hardly affected by air disturbance, and the flexure 22 and load beam 21 cause no fluttering.

According to the second embodiment, it is not necessary to bend the fixing pieces 59A, and therefore, it is easy to manufacture them. Accordingly, it is easy to manufacture the head suspension 11A.

(Third Embodiment)

Figure 10:
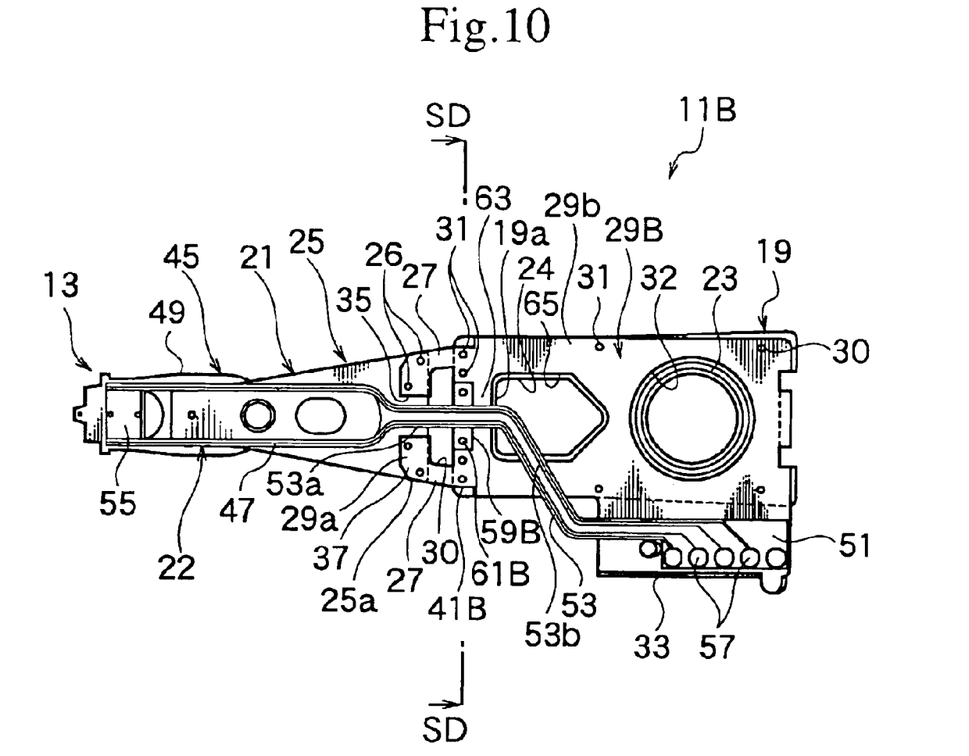
FIG. 10 is a plan view showing a head suspension according to a third embodiment of the present invention seen from a flexure side.
Figure 11:
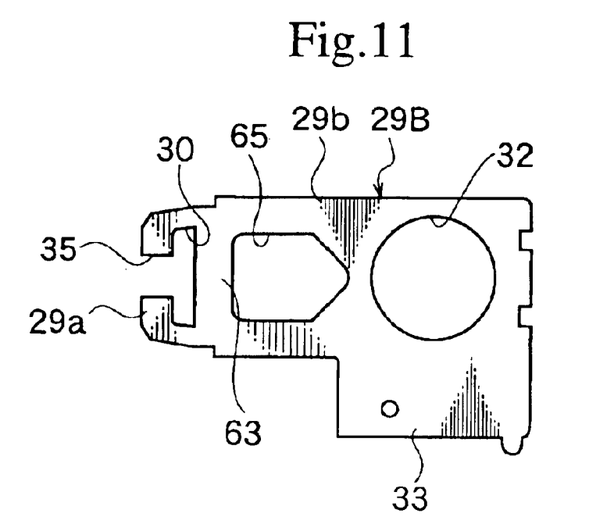
FIG. 11 is a plan view showing a resilient material according to the third embodiment.

FIGS. 10 and 11 show a head suspension for a disk drive according to the third embodiment of the present invention, in which FIG. 10 is a plan view showing the head suspension 11B seen from a flexure side and FIG. 11 is a plan view showing a resilient material 29B. The structure of the third embodiment is basically the same as that of the first embodiment, and therefore, like parts are represented with like reference numerals.

According to the third embodiment, the resilient material 29B has a continuous part 63 instead of the second cuts 39 and 39A of the first and second embodiments. Adjacent to the continuous part 63, there is a through hole 65 corresponding to a window 24 of a plate 19. Fixing pieces 59B flatly protrude from a metal base 45 and are tightly attached to the continuous part 63 of the resilient material 29B. In FIG. 10, the fixing pieces 59B are fixed to the continuous part 63 by, for example, welding (such as laser welding) 61B or bonding.

According to the third embodiment, a resilient part 27 of a load beam 21 is made of the resilient material 29B that is independent of a rigid part 25. A first side 29a of the resilient material 29B is laid on an end 25a of the rigid part 25 and is joined thereto, and a second side 29b thereof is joined to the plate 19. The first side 29a of the resilient material 29B is provided with a cut 35 to expose the end 25a of the rigid part 25. The flexure 22 is extended through the cut 35 to the plate 19.

An opening 30 to set the resiliency of the resilient part 27 is formed between the first and second sides 29a and 29b of the resilient material 29B. The opening 30 is continuous to the cut 35.

The third embodiment provides the same effects as the first embodiment.

The third embodiment has no second cut. The cut 35 and opening 30 of the third embodiment function like those of the first embodiment.

The opening 30, window 24, enlarged part 43, hole 65, and fixing pieces 59, 59A, and 59B of any one of the above-mentioned embodiments may optionally be omitted. If the window 24 is omitted, the enlarged part 43 must also be omitted to prevent impedance variations.

The resilient materials 29, 29A, and 29B may be shortened, and the end 19a of the plate 19 may be fixed to the end of any one of the shortened resilient materials 29, 29A, and 29B. The plate 19 may be formed to serve as a carriage arm.

The linear part 53a of the flexure 22, the first cut 35, and the second cut 39 or 39A may be shifted to one side of the resilient material 29, 29A, or 29B.

What is claimed is:

1. A head suspension for a disk drive, comprising:
a plate attached to a carriage and turned around a spindle;
a load beam having a rigid part and a resilient part and supported by the plate, to apply load on a slider arranged at a front end of the load beam; and
a flexure having a head to write and read data to and from a hard disk and a conductive path to transmit write and read signals to and from the head, the flexure being attached to the load beam and extending toward the plate,
the resilient part of the load beam being made of a resilient material that is independent of the rigid part,
a first side of the resilient material being laid on an end of the rigid part and joined thereto, a second side of the resilient material being joined to the plate,
the first side of the resilient material being provided with a first cut to partly expose the end of the rigid part, and the flexure with the conductive path being extended through the first cut toward the plate.

2. The head suspension for a disk drive of claim 1, wherein:
the resilient material is provided with an opening between the first and second sides thereof, to set the resiliency of the resilient part; and
the first cut is connected to the opening.

3. A head suspension for a disk drive, comprising:
a plate attached to a carriage and turned around a spindle;
a load beam having a rigid part and a resilient part and supported by the plate, to apply load on a slider arranged at a front end of the load beam; and
a flexure having a head to write and read data to and from a hard disk and a conductive path to transmit write and read signals to and from the head, the flexure being attached to the load beam and extending toward the plate,
the resilient part of the load beam being made of a resilient material that is independent of the rigid part,
a first side of the resilient material being laid on an end of the rigid part and joined thereto, a second side of the resilient material being joined to the plate,
the first side of the resilient material being provided with a first cut to partly expose the end of the rigid part, and
the flexure path being extended through the first cut toward the plate;
the second side of the resilient material is provided with a second cut communicating with the first cut, to partly expose the plate; and
the flexure is extended through the second cut.

4. The head suspension for a disk drive of claim 3, wherein:
the resilient material is provided with an opening between the first and second sides thereof, to set the resiliency of the resilient part; and
the first and second cuts are connected to the opening.

5. The head suspension for a disk drive claim 4, wherein:
the second side of the resilient material is generally laid over the plate;
the plate is provided with a through window adjacent to the end of the plate where the resilient material is joined, the second cut of the resilient material being enlarged onto the window; and
the flexure is linearly extended from the rigid part through the first and second cuts onto the window of the plate, the flexure on the window being deflected toward a side of the window.

6. The head suspension for a disk drive of claim 3, wherein:
the second side of the resilient material is generally laid over the plate;
the plate is provided with a through window adjacent to the end of the plate where the resilient material is joined, the second cut of the resilient material being enlarged onto the window; and
the flexure is linearly extended from the rigid part through the first and second cuts onto the window of the plate, the flexure on the window being deflected toward a side of the window.

* * * * *